US011796156B2

United States Patent
Takaku et al.

(10) Patent No.: US 11,796,156 B2
(45) Date of Patent: Oct. 24, 2023

(54) FLUORESCENT PLATE, WAVELENGTH CONVERSION MEMBER, AND LIGHT SOURCE DEVICE

(71) Applicant: NGK SPARK PLUG CO., LTD., Nagoya (JP)

(72) Inventors: Shohei Takaku, Nagoya (JP); Hiroki Yamauchi, Nagoya (JP); Shinji Ban, Nagoya (JP); Hiroki Takeuchi, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/000,864

(22) PCT Filed: Jun. 3, 2021

(86) PCT No.: PCT/JP2021/021144
§ 371 (c)(1),
(2) Date: Dec. 6, 2022

(87) PCT Pub. No.: WO2021/251251
PCT Pub. Date: Dec. 16, 2021

(65) Prior Publication Data
US 2023/0213172 A1    Jul. 6, 2023

(30) Foreign Application Priority Data

Jun. 8, 2020   (JP) ................ 2020-099394

(51) Int. Cl.
*F21V 9/40*     (2018.01)
*F21V 29/502*   (2015.01)
(Continued)

(52) U.S. Cl.
CPC ............ *F21V 9/40* (2018.02); *F21V 7/26* (2018.02); *F21V 29/502* (2015.01); *F21V 29/70* (2015.01)

(58) Field of Classification Search
CPC . F21V 9/40; F21V 7/26; F21V 29/502; F21V 29/70; F21V 9/32; Y02E 10/52; F21Y 2115/10; F21Y 2115/30; F21S 2/00
See application file for complete search history.

(56) References Cited

U.S. PATENT DOCUMENTS

2017/0023199 A1\*  1/2017  Hamada .............. F21S 41/285
2017/0139224 A1    5/2017  Fujii et al.
(Continued)

FOREIGN PATENT DOCUMENTS

| JP | 5989268 A | 9/2016 | |
| JP | 2019045844 A * | 3/2019 | ........... C04B 35/115 |
| WO | WO-2020052256 A1 * | 3/2020 | ........... C04B 35/117 |

OTHER PUBLICATIONS

Japan Patent Office, International Search Report issued in corresponding Application No. PCT/JP2021/021144, dated Jul. 13, 2021.

*Primary Examiner* — Zheng Song
*Assistant Examiner* — Glenn D Zimmerman
(74) *Attorney, Agent, or Firm* — Stites & Harbison, PLLC; Jeffrey A. Haeberlin

(57) ABSTRACT

A fluorescent plate includes a fluorescent phase which emits fluorescence by excitation light, a light-transmitting phase which allows passage of the excitation light, and a plurality of voids surrounded by the fluorescent phase and the light-transmitting phase, wherein, in a cross section of the fluorescent plate including cross sections of the voids, an average ratio of a portion of the circumference of a void, which portion is in contact with the fluorescent phase to the entire circumference of the void, is higher than an area ratio of the area of the fluorescent phase present in the fluorescent plate to the total area of the fluorescent phase and the light-transmitting phase present in the fluorescent plate.

20 Claims, 6 Drawing Sheets

(51) Int. Cl.
*F21V 29/70* (2015.01)
*F21V 7/26* (2018.01)

(56) References Cited

U.S. PATENT DOCUMENTS

| | | | |
|---|---|---|---|
| 2020/0142288 A1* | 5/2020 | Okuno | G02B 5/0247 |
| 2022/0066301 A1* | 3/2022 | Yamamoto | H01L 33/504 |
| 2022/0173284 A1* | 6/2022 | Bohmer | H01L 27/156 |

* cited by examiner

| | AREA RATIO (%) | CIRCUMFERENCE RATIO (%) | EQUIV. CIRCLE DIAM. (micrometers) | RATIO DIFFERENCE (%) | LUMINANCE (cd/mm²) |
|---|---|---|---|---|---|
| sample 1 | 60 | 65 | 3.5 | 5 | 650 |
| sample 2 | 60 | 70 | 3.3 | 10 | 700 |
| sample 3 | 60 | 60 | 3.4 | 0 | 450 |
| sample 4 | 60 | 63 | 3.2 | 3 | 500 |
| sample 5 | 60 | 50 | 3.1 | -10 | 400 |

| | AREA RATIO (%) | CIRCUMFERENCE RATIO (%) | EQUIV. CIRCLE DIAM. (micrometers) | RATIO DIFFERENCE (%) | LUMINANCE (cd/mm²) |
|---|---|---|---|---|---|
| sample 1 | 60 | 65 | 3.5 | 5 | 650 |
| sample 6 | 60 | 65 | 4.6 | 5 | 560 |
| sample 7 | 60 | 65 | 5.6 | 5 | 550 |
| sample 8 | 60 | 65 | 1.0 | 5 | 430 |
| sample 9 | 60 | 65 | 10.0 | 5 | 410 |

| | AREA RATIO (%) | CIRCUMFERENCE RATIO (%) | EQUIV. CIRCLE DIAM. (micrometers) | RATIO DIFFERENCE (%) | LUMINANCE (cd/mm$^2$) |
|---|---|---|---|---|---|
| sample 1 | 60 | 65 | 3.5 | 5 | 650 |
| sample 10 | 30 | 35 | 3.6 | 5 | 540 |
| sample 11 | 75 | 80 | 3.4 | 5 | 580 |
| sample 12 | 20 | 25 | 3.3 | 5 | 420 |
| sample 13 | 85 | 90 | 3.4 | 5 | 600 |
| sample 14 | 90 | 95 | 3.5 | 5 | 620 |

Fig. 6

FLUORESCENT PLATE, WAVELENGTH CONVERSION MEMBER, AND LIGHT SOURCE DEVICE

BACKGROUND OF THE INVENTION

1. Field of the Invention

The present invention relates to a fluorescent plate, to a wavelength conversion member, and to a light source device.

2. Description of Related Art

Heretofore, there has been known a fluorescent plate (or screen) which emits fluorescence when being irradiated with light. In recent years, a number of known fluorescent plates have been highly-functionalized. Specifically, some fluorescent plates include a fluorescent phase which emits light having a wavelength different from that of the irradiation light, and a light-transmitting phase which allows passage of light. For example, Patent Document 1 discloses a technique of providing a specific amount of voids surrounded by the fluorescent phase and the light-transmitting phase.

Patent Document 1 is Japanese Patent No. 5989268.

BRIEF SUMMARY OF THE INVENTION

However, for enhancing the light extraction efficiency of the fluorescent plate, there is still room for improvement in the aforementioned background technique. More specifically, when the technique disclosed in Patent Document 1 is employed, the light emitted by the fluorescent phase is scattered in the voids, thereby often causing attenuation of the resultant light. Thus, the light extraction efficiency of the fluorescent plate may decrease.

Under such circumstances, an object of the present invention is to provide a technique for enhancing the light extraction efficiency of a fluorescent plate.

The present invention has been accomplished so as to solve at least part of the above-described problem and can be realized in the following aspects.

In one aspect of the present invention, a fluorescent plate is provided. The fluorescent plate includes a fluorescent phase which emits fluorescence by excitation light, a light-transmitting phase which allows passage of the excitation light, and a plurality of voids surrounded by the fluorescent phase and the light-transmitting phase, wherein, in a cross section of the fluorescent plate including cross sections of the voids, an average ratio of a portion of the circumference of a void, which portion is in contact with the fluorescent phase to the entire circumference of the void, is higher than a ratio of the area of the fluorescent phase present in the fluorescent plate to the total area of the fluorescent phase and the light-transmitting phase present in the fluorescent plate.

According to the above configuration, the fluorescent plate includes a plurality of voids which are surrounded by the fluorescent phase and the light-transmitting phase. In a cross section of the fluorescent plate including cross sections of the voids, an average ratio of a portion of the circumference of a void, which portion is in contact with the fluorescent phase to the entire circumference of the void, is higher than a ratio of the area of the fluorescent phase present in the fluorescent plate to the total area of the fluorescent phase and the light-transmitting phase present in the fluorescent plate. This feature indicates that the fluorescent phase is present around the voids at a higher ratio than the compositional ratio of the fluorescent phase to the entire fluorescent plate. That is, a relatively large portion of the surface of the fluorescent phase is exposed to the voids. By virtue of this feature, total reflection of the light including the fluorescence emitted from the fluorescent phase by the excitation light is more effectively promoted at the surface of the fluorescent phase, which has a refractive index higher than that of the light-transmitting phase, in the voids, and the quantity of light radiated to the outside of the fluorescent plate can increase. Thus, light extraction efficiency can be enhanced.

In the fluorescent plate of the above aspect, the ratio of the portion of the circumference of a void in contact with the fluorescent phase to the entire circumference of the void may be higher, by 5% or more, than the ratio of the area of the fluorescent phase present in the fluorescent plate to the total area of the fluorescent phase and the light-transmitting phase present in the fluorescent plate. According to this technical feature, in a cross section of the fluorescent plate including cross sections of the voids, the average ratio of the portion of the circumference of a void in contact with the fluorescent phase to the entire circumference of the void is higher, by 5% or more, than the ratio of the area of the fluorescent phase present in the fluorescent plate to the total area of the fluorescent phase and the light-transmitting phase present in the fluorescent plate. Accordingly, the fluorescent phase is present around the voids at a particularly high ratio. Therefore, the light including the fluorescence emitted from the fluorescent phase by the excitation light is more effectively reflected at the surface of the fluorescent phase in the voids, and the quantity of light radiated to the outside of the fluorescent plate can increase. Thus, light extraction efficiency can be further enhanced.

In the fluorescent plate of the above aspect, in a cross section of the fluorescent plate including cross sections of the voids, the plurality of voids may have an average equivalent circle diameter of 1 micrometer or greater and smaller than 10 micrometers. According to this technical feature, the average diameter of the voids is 1 micrometer or greater and smaller than 10 micrometers, which range corresponds to the wavelength of visible light or longer. As a result, passage of visible light included in the fluorescence through the voids is suppressed, and total reflection of visible light at the surface of the fluorescent phase in the voids can be promoted. Thus, the quantity of light radiated to the outside of the fluorescent plate can increase, and light extraction efficiency can be further enhanced.

In the fluorescent plate of the above aspect, in a cross section of the fluorescent plate including cross sections of the voids, a ratio of the area of the fluorescent phase present in the fluorescent plate to the total area of the fluorescent phase and the light-transmitting phase present in the fluorescent plate may be 21% or higher. According to this technical feature, in a cross section of the fluorescent plate including cross sections of the voids, the ratio of the area of the fluorescent phase present in the fluorescent plate to the total area of the fluorescent phase and the light-transmitting phase present in the fluorescent plate is 21% or higher. As a result, the average ratio of a portion of the circumference of a void, which portion is in contact with the fluorescent phase to the entire circumference of the void, can be regulated to such a level that the light extraction efficiency of the fluorescent plate can be enhanced by an increase in reflection of light at the surface of the fluorescent phase in the void. Thus, light extraction efficiency can be further enhanced.

In the fluorescent plate of the above aspect, in a cross section of the fluorescent plate including cross sections of the voids, a ratio of the area of the fluorescent phase present in the fluorescent plate to the total area of the fluorescent phase and the light-transmitting phase present in the fluorescent plate may be 90% or lower. According to this technical feature, light is scattered in a suitable manner in the light-transmitting phase, and the optical path length in the fluorescent phase is comparatively prolonged, whereby a drop in percent light absorption can be suppressed. Thus, light extraction efficiency can be enhanced.

In another aspect of the present invention, a wavelength conversion member is provided. The wavelength conversion member includes the fluorescent plate, and a reflection member which is attached to the fluorescent plate and which reflects the excitation light and the fluorescence. According to the configuration, the wavelength conversion member possesses a reflection member which reflects the fluorescence emitted from the fluorescent plate and the excitation light. Thus, in the fluorescent plate, light radiating to a direction different from the target direction of radiation is reflected by a reflection plate to the target direction. As a result, a large quantity of light can be radiated from the wavelength conversion member.

The wavelength conversion member of the above aspect may further include a heat radiation member for radiating heat of the fluorescent plate to an outside atmosphere. According to the configuration, the wavelength conversion member possesses a heat radiation member for dissipating heat of the fluorescent plate to an outside atmosphere. Thus, in the fluorescent plate, heat generated at fluorescent emission induced by excitation light can be efficiently dissipated to an outside atmosphere, thereby suppressing quenching, which would otherwise be caused by a rise in temperature of the fluorescent plate. As a result, a drop in quantity of light radiated from the wavelength conversion member can be suppressed.

In still another aspect of the present invention, a light source device is provided. The light source device may include the wavelength conversion member, and a light source which radiates the excitation light to the fluorescent plate. According to the configuration, the light source device possesses a light source which radiates the excitation light to the fluorescent plate. When the light source emits excitation light to the fluorescent plate, fluorescence occurs in the fluorescent plate by excitation light. The light including the resultant fluorescence is reflected by the surface of the fluorescent phase whose predominant portions face toward the voids, whereby the quantity of light radiated to the outside the fluorescent plate increases. As a result, the light source device can provide enhanced light emission intensity.

Notably, the present invention can be realized in various modes. For example, the present invention may be realized as a method producing a fluorescent plate, a method for producing a wavelength conversion member, a method for producing a light source device, a system including a light source device, a method for regulating a light source device, a computer program for causing a manufacturing apparatus to execute manufacture of a light source device, and other modes.

BRIEF DESCRIPTION OF THE DRAWINGS

FIG. 4 is a table showing the results of an assessment test on the circumferential ratio of the fluorescent plate.

FIG. 5 is a table showing the results of an assessment test on the equivalent circle diameter of voids in the fluorescent plate.

FIG. 6 is a table showing the results of an assessment test on the area ratio of the fluorescent plate.

DETAILED DESCRIPTION OF EXEMPLARY EMBODIMENTS OF THE INVENTION

1. First Embodiment

Figure 1:
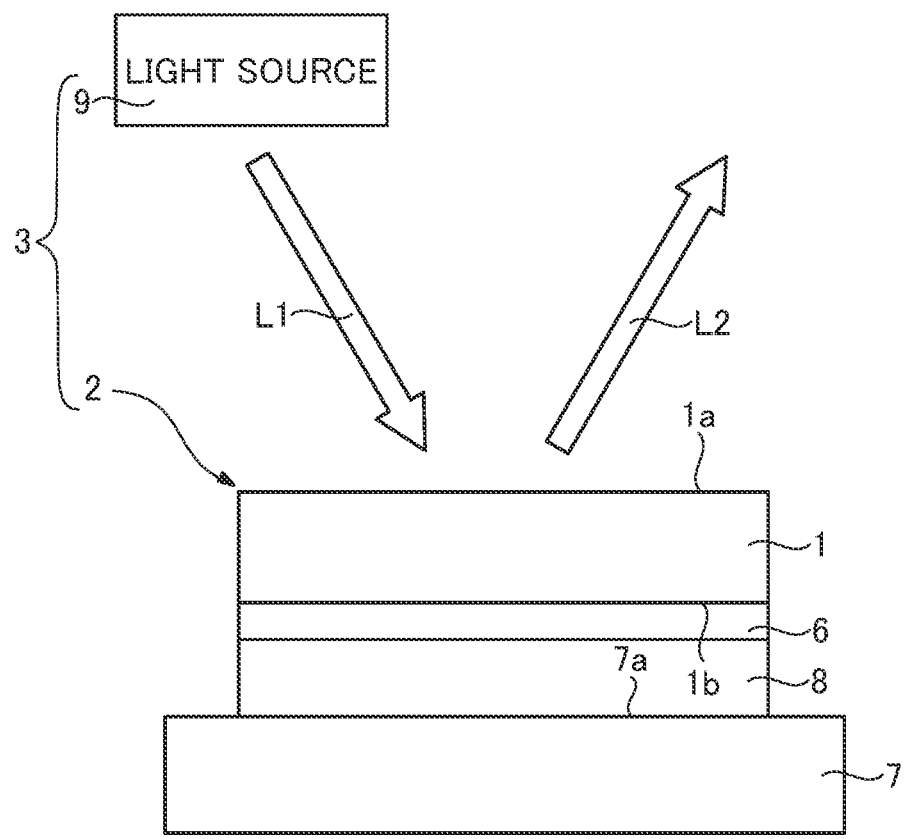
FIG. 1 is a schematic view of a light source device having a fluorescent plate of a first embodiment.

FIG. 1 is a schematic view of a light source device 3 having a fluorescent plate 1 of a first embodiment. When the fluorescent plate 1 of the present embodiment is irradiated with light L1 emitted by a light source 9 (e.g., a light emitting diode (LED) or a semiconductor laser (a laser diode (LD)) belonging to the light source device 3, the fluorescent plate 1 generates florescence having a wavelength different from that of light L1. The fluorescence generated by the fluorescent plate 1 intermingles with light which has not been involved in generation of fluorescence at the fluorescent plate 1, to thereby provide radiation (light L2) toward a specific direction. As shown in FIG. 1, the light source device 3 of the present embodiment is a reflection-type light source device and is used in various types of optical apparatuses such as headlights, lighting equipment, and projectors. The light source device 3 has the aforementioned light source 9 and a wavelength conversion member 2. The wavelength conversion member 2 includes the fluorescent plate 1, a reflection member 6, a heat radiation member 7, and a joint layer 8. For the purpose of illustration, the members are illustrated in FIG. 1 in such a manner that the dimensional relation differs from the actual relation.

The fluorescent plate 1 is a plate-shape member formed of a sintered ceramic material. The fluorescent plate 1 has an incident surface 1a into which the incident light L1 enters, and a backside surface 1b opposite to the incident surface 1a. The fluorescent plate 1 generates fluorescence by the excitation light L1 which enters through the incident surface 1a. During generation of fluorescence, the fluorescent plate 1 generates heat. Detailed description of the fluorescent plate 1 will next be provided.

The reflection member 6 is a thin film mainly formed of silver (Ag) and disposed on the backside surface 1b of the fluorescent plate 1. The reflection member 6 reflects, toward the direction of the incident surface 1a, the light passing through fluorescent plate 1 of the light L1 emitted from the light source 9, and the fluorescence going to the backside surface 1b of the fluorescence generated by the fluorescent plate 1. Notably, the reflection member 6 may be formed of a material having high reflectivity such as silver alloy or aluminum (Al).

The heat radiation member 7 is a plate-shape member formed of a material having a thermal conductivity higher than that of the fluorescent plate 1, such as copper, copper-molybdenum alloy, copper-tungsten alloy, aluminum, or aluminum nitride. The heat radiation member 7 can dissipate heat of the fluorescent plate 1 transferred through the joint layer 8 to an outside atmosphere. Notably, the heat radiation member 7 may be a single-layer member formed of any of the aforementioned materials, or a multi-layer member formed of materials which are identical to or different from one another. In addition, a metal film may be disposed on a fluorescent plate 1 side surface 7a of the heat radiation member 7 so as to enhance adhesion with the joint layer 8.

The joint layer 8 is disposed between the reflection member 6 and the heat radiation member 7 and is formed of gold (Au) and tin (Sn). The joint layer 8 can join the fluorescent plate 1 to the heat radiation member 7 and transfers the heat generated at the fluorescent plate 1 to the heat radiation member 7. Notably, the joint layer 8 may be formed of a material other than gold and tin, and may be formed of a solder of other metals, or a sintered material of a micropowder of, for example, silver or copper (Cu).

Figure 2:
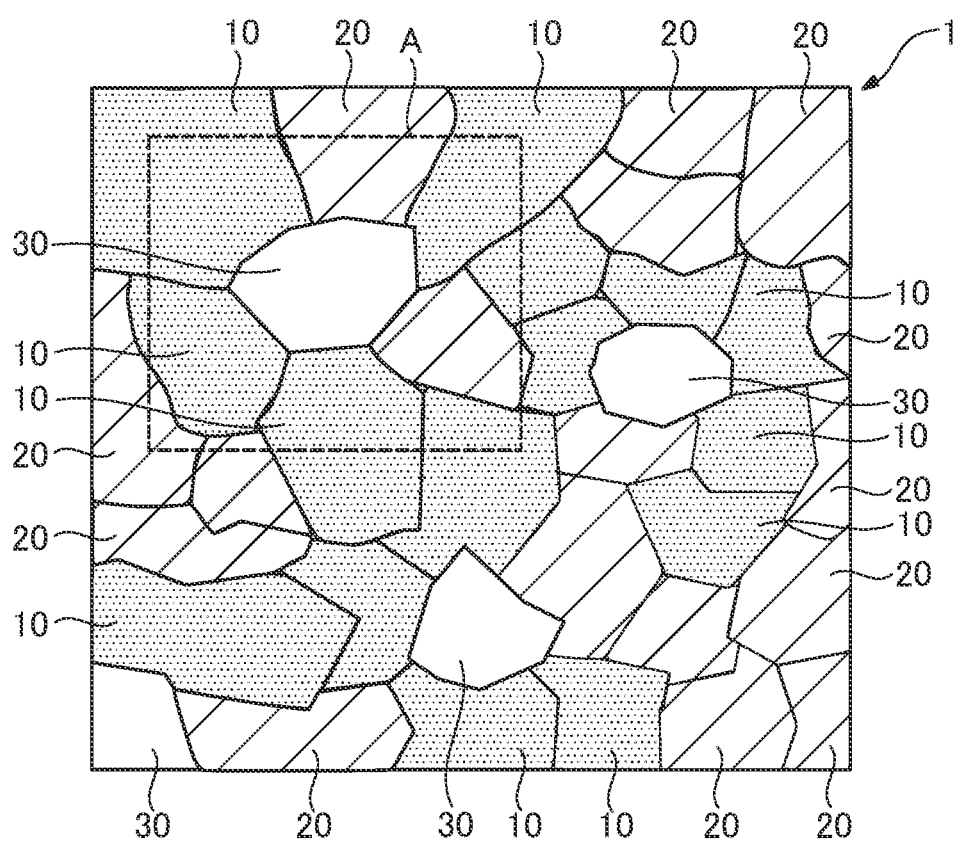
FIG. 2 is an enlarged cross-sectional view of the fluorescent plate.

FIG. 2 is an enlarged cross-sectional view of the fluorescent plate 1. Next, characteristic features of the fluorescent plate 1 of the present embodiment will be described. As shown in FIG. 2, the fluorescent plate 1 has a fluorescent phase 10, a light-transmitting phase 20, and voids 30.

The fluorescent phase 10 is formed of a plurality of fluorescent crystalline particles. In the present embodiment, the fluorescent crystalline particles have a composition represented by a chemical formula $A_3B_5O_{12}$:Ce (i.e., a garnet-type crystal structure). The formula $A_3B_5O_{12}$:Ce denotes that Ce forms a solid solution with $A_3B_5O_{12}$, and element A is partially substituted by Ce. Each of element A and element B in the chemical formula $A_3B_5O_{12}$:Ce represents at least one element selected from the corresponding element group:

element A: Sc, Y, and lanthanoids (except for Ce) (however, element A may further include Gd); and
element B; Al (element B may further include Ga).

Notably, the composition and element type of the fluorescent crystalline particles forming the fluorescent phase 10 are not limited to the aforementioned composition and types of elements. One single fluorescent phase 10 may be formed of fluorescent crystalline particles of a plurality of types.

The light-transmitting phase 20 is formed of a plurality of light-transmitting crystalline particles. The light-transmitting crystalline particles have a composition represented by a chemical formula $Al_2O_3$. The light-transmitting phase 20 disposed in the fluorescent plate 1 allows passage of light and also serves as a heat transfer route which can efficiently transfer heat generated upon generation of fluorescence at the fluorescent phase 10 to the heat radiation member 7. The refractive index of the light-transmitting phase 20 is smaller than that of the fluorescent phase 10.

The voids 30 are provided such that they are surrounded by the fluorescent phase 10 and the light-transmitting phase 20. As shown in FIG. 2, the fluorescent plate 1 of the present embodiment is provided with a plurality of the voids 30. In the present embodiment, the void 30 refers to an area where neither the fluorescent phase 10 nor the light-transmitting phase 20 is present, as observed in a cross section of the fluorescent plate 1 shown in FIG. 2. More specifically, it refers to a space having an equivalent circle diameter (i.e., a diameter of a perfect circle having an area equivalent to that of the cross-sectional area) of 0.4 micrometers or greater and 50 micrometers or smaller. In the present embodiment, the plurality of voids 30 have an average equivalent circle diameter of 1 micrometer or greater and smaller than 10 micrometers. The refractive index of the voids 30 is lower than that of the light-transmitting phase 20. In other words, the refractive index of the voids 30 is lower than that of the fluorescent phase 10.

In the present embodiment, the portion of the fluorescent plate 1 other than voids 30 is formed of the fluorescent phase 10 at a volume ratio of 60% and the light-transmitting phase 20 at a volume ratio of 40%. In other words, in the cross section of the fluorescent plate 1 as shown in FIG. 2, the ratio of the area of the fluorescent phase 10 present in the fluorescent plate 1 to the total area of the fluorescent phase 10 and the light-transmitting phase 20 present in the fluorescent plate 1 is 60%, and the similar area ratio of the light-transmitting phase 20 is 40%. That is, in the cross section of the fluorescent plate 1 of the present embodiment, the area ratio of the fluorescent phase 10 is higher by 20% than that of the light-transmitting phase 20. The area ratio of the fluorescent phase 10 in a cross section of the fluorescent plate 1 is preferably 90% or lower. According to this feature, light is scattered in a suitable manner in the light-transmitting phase 20, and the optical path length in the fluorescent phase 10 is comparatively prolonged, whereby a drop in percent light absorption can be suppressed.

Figure 3:
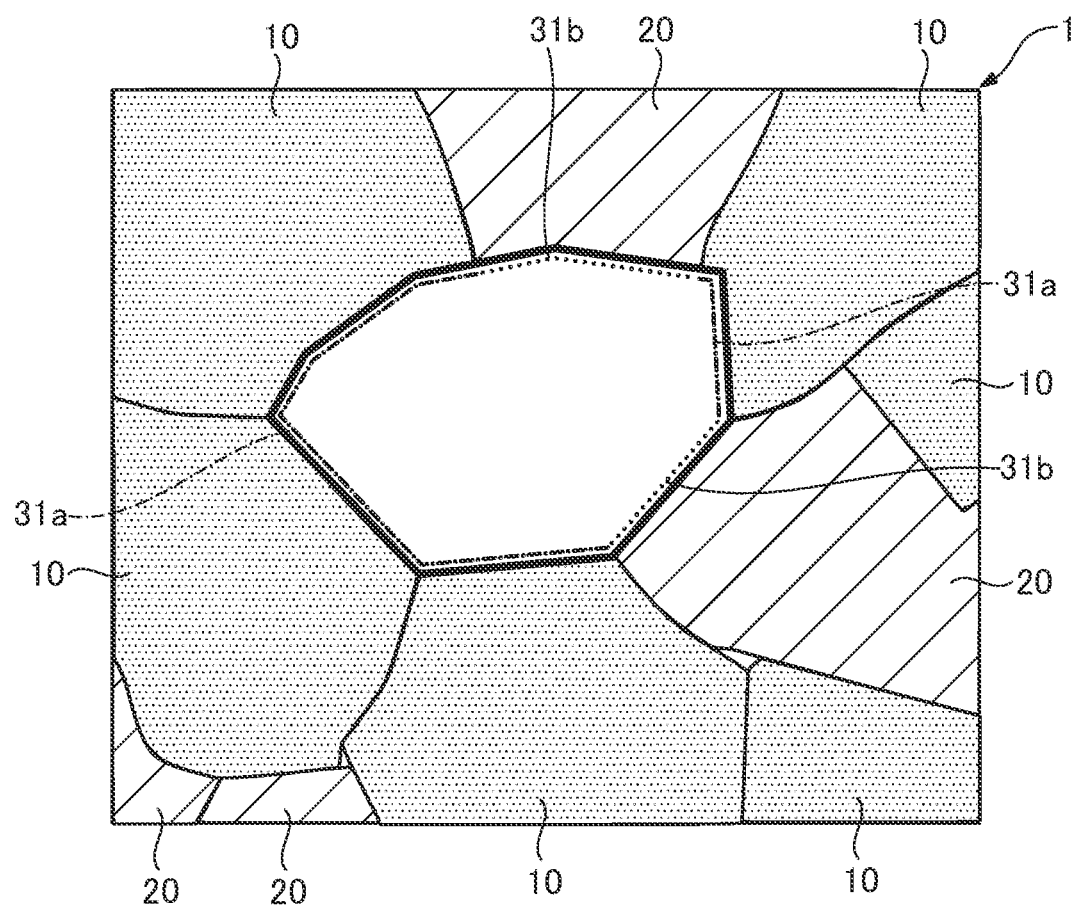
FIG. 3 is an enlarged view of part A of FIG. 2.

FIG. 3 is an enlarged view of part A of FIG. 2. FIG. 3 is a cross section of the fluorescent plate 1 including a typical void 30. As shown in FIG. 3, in the fluorescent plate 1 of the present embodiment, the circumference 31 of the void 30 is in contact with the fluorescent phase 10 or the light-transmitting phase 20. In other words, the void 30 is surrounded by the fluorescent phase 10 and the light-transmitting phase 20, but the surface of the fluorescent phase 10 and that of the light-transmitting phase 20 are exposed to the void 30. Notably, for the purpose of better illustration, the circumference 31 of the void 30 shown in FIG. 3 is denoted by a thicker line as compared with the contour line of the fluorescent phase 10 or the light-transmitting phase 20.

In the void 30 shown in FIG. 3, the full length of the circumference 31 of the void 30 is represented by length L, and the length of a part 31a of the circumference 31 in contact with the fluorescent phase 10 (i.e., a part represented by a dashed line put inside the circumference 31 in FIG. 3) is represented by length La. Also, the ratio of the area of the fluorescent phase 10 present in the fluorescent plate 1 to the total area of the fluorescent phase 10 and the light-transmitting phase 20 present in the fluorescent plate 1 is represented by area ratio Rs. In a single void 30, the relationship between the ratio of the length La of a part of the circumference 31 in contact with the fluorescent phase 10 to the full length L of the circumference 31 (hereinafter, the ratio is referred to as a "circumference ratio"), and the area ratio Rs of the fluorescent plate 1 is represented by the following formula (1).

$$La/L > Rs \qquad (1)$$

In a case shown in FIG. 3, the circumference ratio La/L of the void 30 is about 0.75, and the area ratio Rs is 0.6. Thus, the circumference ratio La/L is greater by about 15% than the area ratio Rs, and the relationship (1) is satisfied. This feature indicates that a relatively large part of the surface of the fluorescent phase 10 is exposed to the void 30. According to the present embodiment, in a cross section of the fluorescent plate 1 including cross sections of voids 30, the average ratio of a portion of the circumference 31 of a void 30, which portion is in contact with the fluorescent phase 10 to the entire circumference 31 of the void 30, is higher than the ratio of the area of the fluorescent phase 10 present in the fluorescent plate 1 to the total area of the fluorescent phase 10 and the light-transmitting phase 20 present in the fluorescent plate 1. The term "average ratio" refers to a value derived by dividing the sum of circumference ratios (La/L) of a plurality of voids 30 present in a cross section of the fluorescent plate 1 by the number of voids 30 included in a cross section of the fluorescent plate 1. For example, in the cross section shown in FIG. 2, the average ratio is calculated by dividing the sum of circumference ratios (La/L) of three voids 30 (except for the broken void 30 at a left corner) by 3 (i.e., the number of voids 30). Notably, a part of the circumference 31 in contact with the light-transmitting phase 20 (i.e., a part represented by a dotted line put inside the circumference 31 in FIG. 3) is represented by reference numeral 31b.

Next, a method for producing the fluorescent plate 1 will be described. In the method for producing the fluorescent plate 1, firstly, $Y_2O_3$, and $CeO_2$ which are weighed in advance, and a pore-forming material (e.g., acrylic beads) are added with pure water, and the mixture is kneaded and pulverized. The product is granulated by means of a spray dryer. Subsequently, $Al_2O_3$ was added to the thus-granulated particles (i.e., powder) in such an amount that the ratio of the fluorescent phase is adjusted to 60 vol %. The resultant mixture is mixed with a specific amount of a binder and a specific amount of a pore-forming material. The resultant mixture was kneaded under shear force, to thereby prepare a ceramic raw material. In the preparation of the ceramic raw material, a portion of acrylic beads to be incorporated into the fluorescent plate 1 is added to $Y_2O_3$ and other components, and the remaining portion of acrylic beads to be incorporated into the fluorescent plate 1 is added to the granulated powder, $Al_2O_3$, and other components. The thus-prepared ceramic raw material is formed into a sheet by means of an extruder, and the sheet is fired at 1,700 degrees Celsius in air for sintering, to thereby yield the fluorescent plate 1.

In the production of a wavelength conversion member 2 including the fluorescent plate 1, a reflection member 6 in the form of a film is formed on the backside 1b of the fluorescent plate 1 through vapor deposition or sputtering of silver. Subsequently, gold-tin solder foil is sandwiched between the heat radiation member 7 and the reflection member 6 as film formed on the fluorescent plate 1, and the stacked body is heated in a reflow furnace under nitrogen or hydrogen. As a result, the fluorescent plate 1 is joined to the heat radiation member 7, whereby the wavelength conversion member 2 is yielded. Notably, instead of use of gold-tin solder foil, joining of the fluorescent plate 1 to the heat radiation member 7 may be performed through application of a gold-tin solder paste.

Further, in the production of a light source device 3 including the wavelength conversion member 2, a light source 9 is set such that an incident surface 1a of the fluorescent plate 1 included in the wavelength conversion member 2 is irradiated with light, to thereby complete packaging of the wavelength conversion member 2 and the light source 9. Thus, the light source device 3 is fabricated.

Next, the fluorescent plate 1 of the present embodiment was assessed by some tests. The details of the tests and the results will be described. In the assessment, a plurality of fluorescent plate samples were prepared. Each sample was irradiated with light, and luminance was measured for each sample, to thereby assess the light extraction efficiency of the sample. The assessment was performed in terms of three characteristics: (i) circumferential ratio; (ii) equivalent circle diameter of voids, and (iii) area ratio.

In the present assessment test, the aforementioned three characteristics were determined through the following methods.

Circumference Ratio and Equivalent Circle Diameter of Voids

Each sample was cut, and the cut surface was mirror-polished. The thus-provided surface was observed under an FE-SEM. In image analysis by use of WinROOF, a cross-sectional image was taken at five points selected at random. The full length of the circumference of each void, the length of a part of the circumference in contact with the fluorescent phase, and the length of a part of the circumference in contact with the light-transmitting phase were determined. Based on the obtained data, the circumference ratio (i.e., the ratio of the length of a part of the circumference in contact with the fluorescent phase to the full length of the circumference of the void) was calculated. The equivalent circle diameter of voids was calculated by use of WinROOF.

Luminance

Each sample was ground to a thickness of 200 micrometers, and a surface of the sample was mirror-polished, to thereby prepare a luminance measurement sample. The luminance measurement sample was irradiated with laser light (wavelength: 450 nm, beam diameter: 0.4 mm, and output: 5 W). The luminance of the light toward the reflection direction was measured by means of a luminance meter.

(i) Circumference Ratio

FIG. 4 is a table showing the results of an assessment test on the circumferential ratio of the fluorescent plate of the first embodiment. Samples for assessment were prepared through a method almost equivalent to the aforementioned method for producing the fluorescent plate 1. In a specific sample preparation procedure, the amount of pore-forming material mixed with $Y_2O_3$ and $CeO_2$ which were weighed in advance was changed, and the remaining pore-forming material was added when $Al_2O_3$ was added to the granulated powder, to thereby prepare a ceramic raw material. In the case of sample 1, firstly, a portion of acrylic beads (50% of the beads to be incorporated into sample 1) was mixed and pulverized with $Y_2O_3$ and $CeO_2$, and the product was granulated by means of a spray dryer. To the granulated powder, the remaining 50% of acrylic beads and $Al_2O_3$ were added, to thereby prepare a ceramic raw material. Other samples were prepared in the same manner, except that the ratio of the amount of the first addition of acrylic beads to that of the second addition thereof was varied, to thereby modify the circumference ratio of the fluorescent plate. Sample 1 shown in the table of FIG. 4 was a sample having the same characteristics (area ratio, circumference ratio, and equivalent circle diameter of voids) as those of the fluorescent plate 1 of the present embodiment and employed as a reference sample in the assessment test. As shown in FIG. 4, the test results have revealed that a higher luminance can be achieved as the difference between the circumference ratio and the area ratio (hereinafter referred to as a "ratio difference") increases. Particularly when the ratio difference was 3% or greater, a luminance of 500 $cd/mm^2$ was attained. Thus, the light extraction efficiency of the fluorescent plate was found to be enhanced.

(ii) Equivalent Circle Diameter of Voids

FIG. 5 is a table showing the results of an assessment test on the equivalent circle diameter of voids of the fluorescent plate of the first embodiment. Samples for assessment were prepared through a method almost equivalent to the aforementioned method for producing the fluorescent plate 1. In a specific sample preparation procedure, the particle size of the pore-forming material mixed with $Y_2O_3$ and $CeO_2$ which were weighed in advance and the particle size of the pore-forming material added to the granulated powder with $Al_2O_3$ were changed. As is clear from FIG. 5, the test results have revealed that, when the equivalent circle diameter of voids was 3.5 micrometers, 4.6 micrometers, and 5.6 micrometers, the luminance was higher than 500 $cd/mm^2$. In contrast, when the equivalent circle diameter of voids was 1.0 micrometers and 10 micrometers, the luminance was found to be lower than 500 $cd/mm^2$. Thus, when the equivalent circle diameter of voids was greater than 1.0 micrometer and smaller than 10 micrometers, a higher luminance was found to be achieved. Notably, sample 1 shown in the table of FIG. 5 is the same as sample 1 shown in FIG. 4.

(iii) Area Ratio

FIG. 6 is a table showing the results of an assessment test on the area ratio of the fluorescent plate. Samples for assessment were prepared through a method almost equivalent to the aforementioned method for producing the fluorescent plate 1. In a specific sample preparation procedure, the amounts of $Y_2O_3$ and $CeO_2$ to which a pore-forming material and pure water were to be added were modified. As is clear from FIG. 6, the test results have revealed that, when the area ratio was 30% or greater and 90% or smaller (i.e., 30%, 60%, 75%, 85%, and 90%), a luminance of 500 $cd/mm^2$ or higher was achieved. In contrast, when the area ratio was 20%, the luminance was found to be lower than 500 $cd/mm^2$. Notably, sample 1 shown in the table of FIG. 6 is the same as sample 1 shown in FIG. 4.

According to the aforementioned fluorescent plate 1 of the present embodiment, the fluorescent plate 1 includes a plurality of voids 30 which are surrounded by the fluorescent phase 10 and the light-transmitting phase 20. In a cross section of the fluorescent plate 1 including cross sections of the voids 30, the average ratio of a portion 31a of the circumference 31 of a void 30, which portion is in contact with the fluorescent phase 10 to the entire circumference of the void 30, is higher than the ratio of the area of the fluorescent phase 10 present in the fluorescent plate 1 to the total area of the fluorescent phase 10 and the light-transmitting phase 20 present in the fluorescent plate 1. This feature indicates that the fluorescent phase 10 is present around the voids 30 at a higher ratio than the compositional ratio of the fluorescent phase 10 to the entire fluorescent plate 1. That is, a relatively large portion of the surface of the fluorescent phase 10 is exposed to the voids 30. By virtue of this feature, total reflection of the light including the fluorescence emitted from the fluorescent phase 10 by the excitation light is more effectively promoted at the surface of the fluorescent phase 10, which has a refractive index higher than that of the light-transmitting phase 20, in the voids 30, and the quantity of light radiated to the outside of the fluorescent plate 1 can increase. Thus, light extraction efficiency can be enhanced.

According to the fluorescent plate 1 of the present embodiment, in a cross section of the fluorescent plate 1 including cross sections of the voids 30, the average ratio of the portion 31a of the circumference 31 of a void 30 in contact with the fluorescent phase 10 to the entire circumference 31 of the void 30 is higher, by 5% or more, than the ratio of the area of the fluorescent phase 10 present in the fluorescent plate 1 to the total area of the fluorescent phase 10 and the light-transmitting phase 20 present in the fluorescent plate 1. Accordingly, the fluorescent phase 10 is present around the voids 30 at a particularly high ratio. Therefore, the light including the fluorescence emitted from the fluorescent phase 10 by the excitation light is more effectively reflected at the surface of the fluorescent phase 10 in the voids 30, and the quantity of light radiated to the outside of the fluorescent plate 1 can increase. Thus, light extraction efficiency can be further enhanced.

According to the fluorescent plate 1 of the present embodiment, the average equivalent circle diameter of the voids 30 is 1 micrometer or greater and smaller than 10 micrometers, which range corresponds to the wavelength of visible light or longer. As a result, passage of visible light included in the fluorescence through the voids 30 is suppressed, and total reflection of visible light at the surface of the fluorescent phase 10 in the voids 30 can be promoted. Thus, the quantity of light radiated to the outside of the fluorescent plate 1 can increase, and light extraction efficiency can be further enhanced.

According to the fluorescent plate 1 of the present embodiment, in a cross section of the fluorescent plate 1 including cross sections of the voids 30, the ratio of the area of the fluorescent phase 10 present in the fluorescent plate 1 to the total area of the fluorescent phase 10 and the light-transmitting phase 20 present in the fluorescent plate 1 is 60%, falling within a range of 21% or higher and 90% or lower. As a result, the average ratio of a portion 31a of the circumference 31 of a void 30, which portion is in contact with the fluorescent phase 10 to the entire circumference 31 of the void 30, can be regulated to such a level that the light extraction efficiency of the fluorescent plate 1 can be enhanced by an increase in reflection of light at the surface of the fluorescent phase 10 in the void 30. Also, light is scattered in a suitable manner in the light-transmitting phase, and the optical path length in the fluorescent phase is comparatively prolonged, whereby a drop in percent light absorption can be suppressed. Thus, light extraction efficiency can be further enhanced.

According to the wavelength conversion member 2 of the present embodiment, the wavelength conversion member 2 includes a reflection member 6 which reflects the fluorescence emitted from the fluorescent plate 1 and the excitation light. According to the configuration, as shown in, for example, FIG. 1, in the fluorescent plate 1, light radiating to a direction different from the direction of light L2 is reflected by the reflection member 6 toward the target direction. As a result, a large quantity of light can be radiated from the wavelength conversion member 2.

According to the wavelength conversion member 2 of the present embodiment, the wavelength conversion member 2 possesses a heat radiation member 7 for dissipating heat of the fluorescent plate 1 to an outside atmosphere. Thus, in the fluorescent plate 1, heat generated at fluorescent emission induced by excitation light can be efficiently dissipated to an outside atmosphere, thereby suppressing quenching, which would otherwise be caused by a rise in temperature of the fluorescent plate 1. As a result, a drop in quantity of light radiated from the wavelength conversion member 2 can be suppressed.

According to the light source device 3 of the present embodiment, the light source device 3 has a light source 9 which radiates light L1 to the fluorescent plate 1. When the light source 9 emits light L1 to the fluorescent plate 1, fluorescence is generated in the fluorescent plate 1 by a certain light component of light L1. The fluorescence emitted by fluorescent plate 1 is reflected by the surface of the fluorescent phase 10 whose predominant portions face toward the voids 30, whereby the quantity of light radiated to the outside the fluorescent plate 1 increases. As a result, the light source device 3 can provide enhanced light emission intensity.

2. Modifications of the Present Embodiment

The present invention is not limited to the above-described embodiment and can be practiced in various forms without departing from the gist of the invention, and, for example, the following modifications are possible.

a. Modification 1

In the aforementioned embodiment, one void 30 of the fluorescent plate 1 as shown in FIG. 3 had a circumference ratio La/L of about 0.75 and an area ratio Rs of 0.6. Thus, the ratio of the portion 31a of the circumference 31 in contact with the fluorescent phase 10 to the entire circumference 31 was higher, by 5% or more, than the ratio of the area of the fluorescent phase 10 present in the fluorescent plate 1 to the total area of the fluorescent phase 10 and the light-transmitting phase 20 present in the fluorescent plate 1. The difference between the ratio of the portion 31a of the circumference 31 in contact with the fluorescent phase 10 to the entire circumference 31 and the area ratio may be smaller than 5%. However, when the difference is greater, light is more effectively reflected at the surface of the fluorescent phase 10 in the voids 30, whereby the quantity of light radiated to the outside of the fluorescent plate 1 can increase.

b. Modification 2

In the aforementioned embodiment, the average equivalent circle diameter of a plurality of voids 30 was adjusted to 1 micrometer or greater and smaller than 10 micrometers. The average equivalent circle diameter of a plurality of voids 30 may be smaller than 1 micrometer or 10 micrometers or greater. However, when the average equivalent circle diameter of the voids 30 is adjusted to 1 micrometer or greater and smaller than 10 micrometers, which range corresponds to the wavelength of visible light or longer, visible light can be more effectively reflected at the surface of the fluorescent phase 10.

c. Modification 3

In the aforementioned embodiment, in a cross section of the fluorescent plate 1, the ratio of the area of the fluorescent phase 10 present in the fluorescent plate 1 to the total area of the fluorescent phase 10 and the light-transmitting phase 20 present in the fluorescent plate 1 was adjusted to 60%, but no particular limitation is imposed on the area ratio of the fluorescent phase 10 in the fluorescent plate 1. When the area ratio of the fluorescent phase 10 is 21% or higher, the average ratio of the fluorescent phase 10 can be regulated to such a level that the light extraction efficiency of the fluorescent plate 1 can be enhanced by an increase in reflection of light at the surface of the fluorescent phase 10 in the void 30. Thus, light extraction efficiency can be enhanced. Also, when the area ratio of the fluorescent phase 10 is 90% or lower, light is scattered in a suitable manner in the light-transmitting phase, and the optical path length in the fluorescent phase is comparatively prolonged, whereby a drop in percent light absorption can be suppressed. Thus, light extraction efficiency can be enhanced.

d. Modification 4

According to the aforementioned embodiment, the light source device 3 is a reflection-type light source device. However, the fluorescent plate 1 may be applied to a transmission-type light source device.

e. Modification 5

In the aforementioned embodiment, the portion of the fluorescent plate 1 other than voids 30 was formed of the fluorescent phase 10 at a volume ratio of 60% and the light-transmitting phase 20 at a volume ratio of 40%. However, the compositional ratio of the fluorescent plate 1 may be the fluorescent phase 10 at a volume ratio less than 100% and the light-transmitting phase 20 at a volume ratio less than 100%. In the fluorescent plate 1, the light-transmitting phase 20 allows passage of light in such a manner that the fluorescent phase 10 throughout the fluorescent plate 1 can emit fluorescence, and also serves as a heat conduction path for dissipating the heat generated in the fluorescent phase 10 to the outside atmosphere. Therefore, the compositional ratio of the light-transmitting phase 20 is preferably, for example, about 10%. When the ratio of the fluorescent phase 10 is 90% or higher, difficulty is encountered in controlling the circumference ratio.

Although the present aspects have been described on the basis of embodiments and modifications, the above-described embodiments of the aspects is provided so as to facilitate the understanding of the present aspects and does not limit the present aspect. The present aspects can be changed or improved without departing from the purpose of the aspects and the claims, and encompasses equivalents thereof. Also, the technical feature(s) may be eliminated as appropriate unless the present specification mentions that the technical feature(s) is mandatory.

DESCRIPTION OF REFERENCE SIGNS

1: fluorescent plate
2: wavelength conversion member
3: light source device
6: reflection member
7: heat radiation member
9: light source
10: fluorescent phase
20: light-transmitting phase
30: void
31: circumference
31a: portion in contact with fluorescent phase
L1: excitation light
L2: radiation light
Rs: area ratio

What is claimed is:

1. A fluorescent plate comprising:
a fluorescent phase which emits fluorescence by excitation light,
a light-transmitting phase which allows passage of the excitation light, and
a plurality of voids surrounded by the fluorescent phase and the light-transmitting phase,
wherein, in a cross section of the fluorescent plate including cross sections of the voids, an average ratio of a portion of the circumference of a void, which portion is in contact with the fluorescent phase to the entire circumference of the void, is higher than
a ratio of the area of the fluorescent phase present in the fluorescent plate to the total area of the fluorescent phase and the light-transmitting phase present in the fluorescent plate.

2. The fluorescent plate according to claim 1,
wherein the ratio of the portion of the circumference of a void in contact with the fluorescent phase to the entire circumference of the void is higher, by 5% or more, than the ratio of the area of the fluorescent phase present in the fluorescent plate to the total area of the fluorescent phase and the light-transmitting phase present in the fluorescent plate.

3. The fluorescent plate according to claim 1,
wherein, in a cross section of the fluorescent plate including cross sections of the voids, the plurality of voids have an average equivalent circle diameter of 1 micrometer or greater and smaller than 10 micrometers.

4. The fluorescent plate according to claim 1,
wherein, in a cross section of the fluorescent plate including cross sections of the voids, a ratio of the area of the fluorescent phase present in the fluorescent plate to the total area of the fluorescent phase and the light-transmitting phase present in the fluorescent plate is 21% or higher.

5. The fluorescent plate according to claim 1,
wherein, in a cross section of the fluorescent plate including cross sections of the voids, a ratio of the area of the fluorescent phase present in the fluorescent plate to the total area of the fluorescent phase and the light-transmitting phase present in the fluorescent plate is 90% or lower.

6. A wavelength conversion member comprising:
the fluorescent plate as recited in claim 1, and
a reflection member which is attached to the fluorescent plate and which reflects the excitation light and the fluorescence.

7. The fluorescent plate according to claim 2,
wherein, in a cross section of the fluorescent plate including cross sections of the voids, the plurality of voids have an average equivalent circle diameter of 1 micrometer or greater and smaller than 10 micrometers.

8. The fluorescent plate according to claim 2,
wherein, in a cross section of the fluorescent plate including cross sections of the voids, a ratio of the area of the fluorescent phase present in the fluorescent plate to the total area of the fluorescent phase and the light-transmitting phase present in the fluorescent plate is 21% or higher.

9. The fluorescent plate according to claim 2,
wherein, in a cross section of the fluorescent plate including cross sections of the voids, a ratio of the area of the fluorescent phase present in the fluorescent plate to the total area of the fluorescent phase and the light-transmitting phase present in the fluorescent plate is 90% or lower.

10. A wavelength conversion member comprising:
the fluorescent plate as recited in claim 2, and
a reflection member which is attached to the fluorescent plate and which reflects the excitation light and the fluorescence.

11. The fluorescent plate according to claim 3,
wherein, in a cross section of the fluorescent plate including cross sections of the voids, a ratio of the area of the fluorescent phase present in the fluorescent plate to the total area of the fluorescent phase and the light-transmitting phase present in the fluorescent plate is 21% or higher.

12. The fluorescent plate according to claim 3,
wherein, in a cross section of the fluorescent plate including cross sections of the voids, a ratio of the area of the fluorescent phase present in the fluorescent plate to the total area of the fluorescent phase and the light-transmitting phase present in the fluorescent plate is 90% or lower.

13. A wavelength conversion member comprising:
the fluorescent plate as recited in claim 3, and
a reflection member which is attached to the fluorescent plate and which reflects the excitation light and the fluorescence.

14. The fluorescent plate according to claim 4,
wherein, in a cross section of the fluorescent plate including cross sections of the voids, a ratio of the area of the fluorescent phase present in the fluorescent plate to the total area of the fluorescent phase and the light-transmitting phase present in the fluorescent plate is 90% or lower.

15. A wavelength conversion member comprising:
the fluorescent plate as recited in claim 4, and
a reflection member which is attached to the fluorescent plate and which reflects the excitation light and the fluorescence.

16. The wavelength conversion member according to claim 6, further comprising a heat radiation member for radiating heat of the fluorescent plate to an outside atmosphere.

17. A light source device comprising:
the wavelength conversion member as recited in claim 6, and
a light source which radiates the excitation light to the florescent plate.

18. The fluorescent plate according to claim 7,
wherein, in a cross section of the fluorescent plate including cross sections of the voids, a ratio of the area of the fluorescent phase present in the fluorescent plate to the total area of the fluorescent phase and the light-transmitting phase present in the fluorescent plate is 90% or lower.

19. A wavelength conversion member comprising:
the fluorescent plate as recited in claim 5, and
a reflection member which is attached to the fluorescent plate and which reflects the excitation light and the fluorescence.

20. A light source device comprising:
the wavelength conversion member as recited in claim 16, and
a light source which radiates the excitation light to the florescent plate.

* * * * *